United States Patent
Hanlon et al.

[11] Patent Number: 6,105,141
[45] Date of Patent: Aug. 15, 2000

[54] METHOD AND APPARATUS FOR POWER MANAGEMENT OF AN EXTERNAL CACHE OF A COMPUTER SYSTEM

[75] Inventors: Michael S. Hanlon, San Jose; Michael E. Larson, Sunnyvale, both of Calif.

[73] Assignee: Apple Computer, Inc., Cupertino, Calif.

[21] Appl. No.: 09/090,644

[22] Filed: Jun. 4, 1998

[51] Int. Cl.$^7$ .................................................. G06F 1/32
[52] U.S. Cl. ........................................ 713/323; 713/324
[58] Field of Search ................................ 713/300–340, 713/600–601; 711/117–146

[56] References Cited

U.S. PATENT DOCUMENTS

| | | | |
|---|---|---|---|
| 5,142,684 | 8/1992 | Perry et al. ............................ | 709/102 |
| 5,239,652 | 8/1993 | Seibert et al. ......................... | 713/323 |
| 5,416,726 | 5/1995 | Garcia-Duarte et al. ............... | 713/300 |
| 5,481,731 | 1/1996 | Conary et al. ......................... | 711/141 |
| 5,511,203 | 4/1996 | Wisor et al. ........................... | 713/322 |
| 5,530,932 | 6/1996 | Carmean et al. ...................... | 713/324 |
| 5,544,307 | 8/1996 | Maemura ............................... | 712/227 |
| 5,586,332 | 12/1996 | Jain et al. ............................... | 713/322 |
| 5,632,038 | 5/1997 | Fuller ..................................... | 713/324 |
| 5,721,935 | 2/1998 | DeSchepper et al. ................. | 713/323 |
| 5,724,611 | 3/1998 | Evoy ...................................... | 710/28 |
| 5,752,045 | 5/1998 | Chen ...................................... | 713/322 |
| 5,809,532 | 9/1998 | Eno et al. ............................... | 711/141 |
| 5,813,022 | 9/1998 | Ramsey et al. ........................ | 711/3 |
| 5,901,322 | 5/1999 | Herbst et al. .......................... | 711/118 |
| 5,931,951 | 8/1999 | Ando ..................................... | 713/324 |

*Primary Examiner*—Glenn A. Auve
*Assistant Examiner*—Sumati Lefkowitz
*Attorney, Agent, or Firm*—Beyer Weaver & Thomas, LLP

[57] ABSTRACT

Power management techniques for external cache memories of computers are disclosed. The power management techniques operate to reduce power consumption of an external cache memory of a computer system by intelligently placing the external cache memory in a low power mode. In one embodiment of the invention, a computer operates using event loop and an idle loop. The computer generally remains in the event loop while there is activity that requires processing, but enters the idle loop when there is no activity so that power consumption is lowered. The power management techniques according to the invention reduce power consumption of the computer by placing the external cache memory in the low power state upon entering the idle loop, and then awakening the external cache memory as the microprocessor awakens or upon exiting the idle loop. The power savings provided by the invention are particularly suitable for use with battery powered computing devices.

25 Claims, 6 Drawing Sheets

METHOD AND APPARATUS FOR POWER MANAGEMENT OF AN EXTERNAL CACHE OF A COMPUTER SYSTEM

BACKGROUND OF THE INVENTION

1. Field of the Invention

The present invention relates to computing devices and, more particularly, to computing devices having external caches.

2. Description of the Related Art

Conventionally, portable computer systems often use power management techniques to place a microprocessor in a lower power mode when the computer system is idle or otherwise has a low processing demand. It is also known that other subsystems of portable computer systems can likewise be placed in low power modes.

Today, conventional portable computer systems often includes an internal cache memory and an external cache memory. The internal cache memory is often integrated into the microprocessor chip, while the external cache memory is typically a separate chip. The internal cache memory is also known as a primary cache memory, and the external cache memory is also known as a secondary cache memory. Conventionally, when the microprocessor enters a low power mode, the entire microprocessor chip including the internal cache memory enters the low power mode. The external cache memory is normally not power managed; hence, it always remains in the normal power mode. However, to save additional power, the computer system can also place the external cache subsystem in a low power mode. U.S. Pat. No. 5,632,038 describes a secondary cache memory system that is turned off when the processor of the computer system is determined to be inactive. A control register is used by the microprocessor to inform a cache controller on how to control the secondary cache memory system.

Computer systems often function in control loops to control operation of the computer systems. The control loops include an event loop and an idle loop. The event loop monitors the computer system for events and upon receiving an event causes the event to be processed. The idle loop is used by the computer system when there are no events for the event loop to process. The microprocessor for the computer system is placed in the low power mode upon entering the idle loop where small amounts of processing for administrative and background matters are performed. Thus, the computer system enters the idle loop to reduce power consumption.

One problem of the conventional approaches is that efficient power management of external cache memories has not been provided in a manner suitable for use in idle loops. Conventional idle loops are also not equipped to facilitate power management of external cache memories.

Thus, there is a need for more robust techniques for managing power consumption by an external cache of a computer system.

SUMMARY OF THE INVENTION

Broadly speaking, the invention relates to power management techniques for external cache memories of computers. The power management techniques operate to reduce power consumption of an external cache memory of a computer system by intelligently placing the external cache memory in a low power mode. The power savings provided by the invention are particularly suitable for use with battery powered computing devices.

In one embodiment of the invention, a computer operates using event loop and an idle loop. The computer generally remains in the event loop while there is activity that requires processing, but enters the idle loop when there is no activity so that power consumption is lowered. When the computer operates in the event loop a microprocessor and an external cache are both in an active state (normal power mode), whereas when the computer operates in the idle loop the microprocessor and the external cache memory are at most only periodically in the active state and otherwise in a low power state. The power management techniques according to the invention reduce power consumption of the computer by placing the external cache memory in the low power state upon entering the idle loop, and then awakening the external cache memory as the microprocessor awakens or upon exiting the idle loop.

The invention can be implemented in numerous ways, including as a method, an apparatus, and a computer system. Several embodiments of the invention are discussed below.

As a method for reducing power consumption of a computer system, the computer system including a processor, system memory, and an external cache memory, an embodiment of the invention includes the operations of: entering an idle mode in which the processor and the external cache memory are in a sleep state; determining whether an interrupt has occurred; awakening the processor from the sleep state to a normal state when the determining determines that an interrupt has occurred; servicing the interrupt; performing idle processing without use of the external cache memory which remains in the sleep state; determining whether the idle mode should be exited and a normal mode entered; and awakening the external cache memory from the sleep state to a normal state when the determining determines that the idle mode is to exited and the normal mode entered.

As a method for reducing power consumption of a computer system, the computer system including a processor, system memory, an external cache memory, an embodiment of the invention includes the operations of: entering an idle mode in which the processor and the external cache memory are in a sleep state and in which content from the external cache memory has been flushed to system memory; determining whether an interrupt has occurred; awakening the processor and the external cache memory from the sleep state to a normal state when the determining determines that an interrupt has occurred; restoring the content of the external cache memory following the awakening of the external cache memory; servicing the interrupt; performing idle processing without use of the external cache memory which remains in the sleep state; and determining whether the idle mode should be exited and a normal mode entered.

As a computer system, an embodiment of the invention includes at least a microprocessor, an external secondary cache memory, and a power management unit operatively connected to the microprocessor and the external cache memory. The microprocessor executes instructions associated with an event loop or an idle loop, and the microprocessor includes an internal primary cache memory for temporarily storing data for use by the microprocessor. The microprocessor has a normal power mode and a low power mode. The external secondary cache memory temporarily stores data for use by the microprocessor, and the microprocessor has a normal power mode and a low power mode. The power management unit controls whether the microprocessor and the external secondary cache memory are placed in either the normal power mode or the low power mode, respectively. In the event loop, the microprocessor and the external secondary cache memory are in the normal power mode, and in the idle loop, the microprocessor and the external secondary cache memory are mostly in the low power mode but periodically at least the microprocessor is in the normal power mode to service an interrupt and perform idle processing.

The advantages of the invention are numerous. One advantage of the invention is that with the power management techniques of the invention, the computer system as a whole, and in particular an external cache of the computer system, consumes less power. Another advantage of the invention is that battery powered devices obtain improved battery life through use of the power management techniques of the invention.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to power management techniques for external cache memories of computers. The power management techniques operate to reduce power consumption of an external cache memory of a computer system by intelligently placing the external cache memory in a low power mode. The power savings provided by the invention are particularly suitable for use with battery powered computing devices.

In one embodiment of the invention, a computer operates using event loop and an idle loop. The computer generally remains in the event loop while there is activity that requires processing, but enters the idle loop when there is no activity so that power consumption is lowered. When the computer operates in the event loop a microprocessor and an external cache are both in an active state (normal power mode), whereas when the computer operates in the idle loop the microprocessor and the external cache memory are at most only periodically in the active state and otherwise in a low power state. The power management techniques according to the invention reduce power consumption of the computer by placing the external cache memory in the low power state upon entering the idle loop, and then awakening the external cache memory as the microprocessor awakens or upon exiting the idle loop. The power savings provided by the invention are particularly suitable for use with battery powered computing devices.

The power management techniques according to the invention include one technique to manage the power utilization of a secondary cache memory such that the secondary cache memory is placed into a low power state whenever the microprocessor is to be placed in a low power state. Hence, when entering an idle loop, both the secondary cache and the microprocessor would be placed in the low power state, and then when processing is needed (for whatever reason), both the secondary cache and the microprocessor would be returned to the active state. Another, and more power efficient, technique would be to place the secondary cache into a low power state upon entry of an idle mode, and then return the secondary cache memory to its active state only just before the idle mode exits.

Embodiments of the invention are discussed below with reference to FIGS. 1–4B. However, those skilled in the art will readily appreciate that the detailed description given herein with respect to these figures is for explanatory purposes as the invention extends beyond these limited embodiments.

Figure 1:
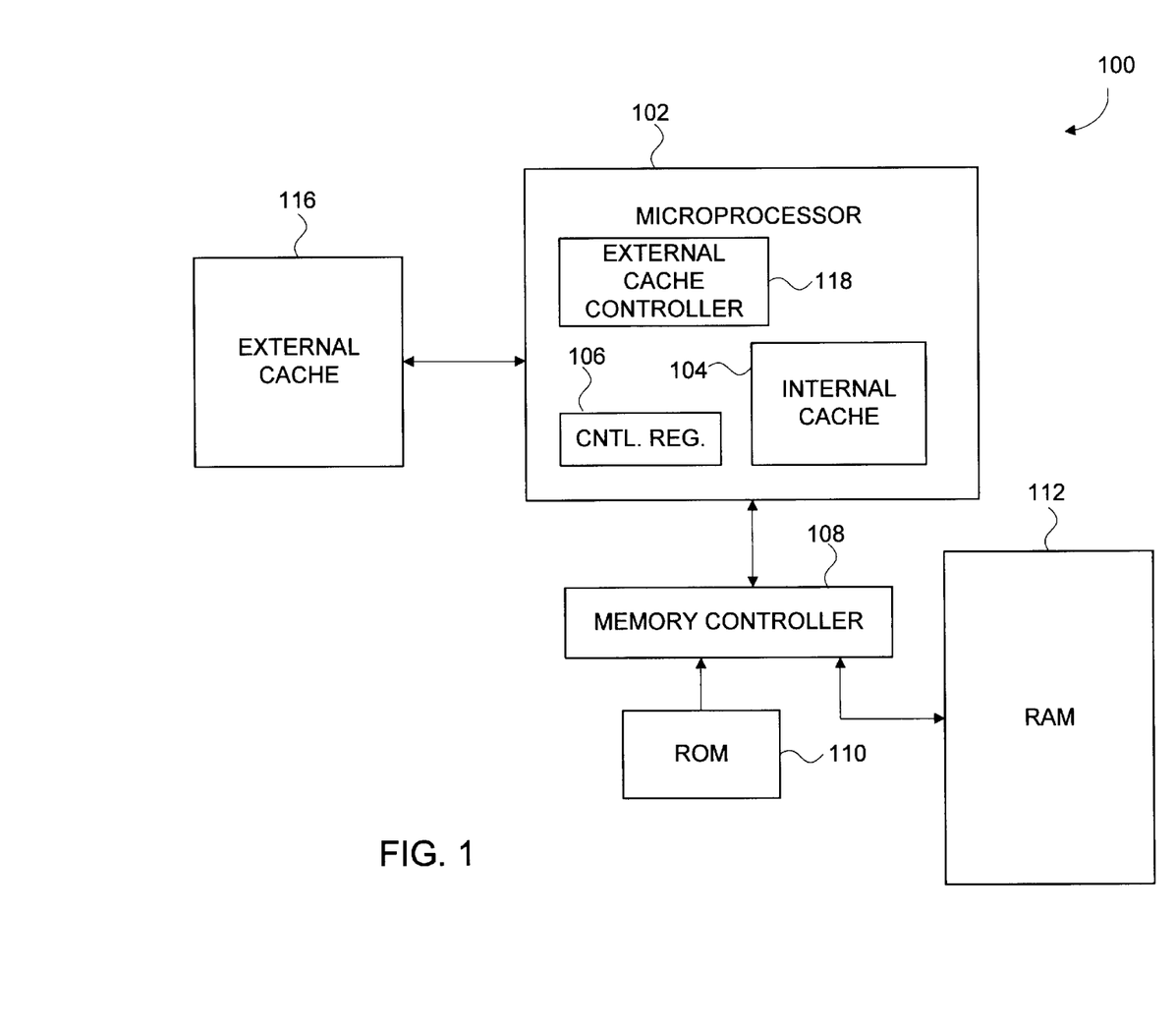
FIG. 1 is a block diagram of a computer system according to an embodiment of the invention.

FIG. 1 is a block diagram of a computer system 100 according to an embodiment of the invention. The computer system 100 includes a microprocessor 102 that executes computer instructions to perform various operations to be carried out by the computer system 100. The microprocessor 102 includes an internal cache 104 and a control register 106. The internal cache 104 is an internal cache memory that provides high speed data access for the microprocessor 102. The control register 106 stores flags or other information associated with the microprocessor 102 or the computer system 100. As an example, one portion of the control register 106 could indicate whether or not an external cache of the computer system 100 is available for use, and another portion of the control register 106 could indicate whether the microprocessor 102 is in an active state or a low power state.

The computer system 100 also includes a memory controller 108. The memory controller 108 controls the access of the microprocessor 102 to system memory, including read-only-memory (ROM) 110 or read-access-memory (RAM) 112. In addition, the computer system 100 includes an external cache 116 and an external cache controller 118. The external cache 116 also provides high speed data access for the microprocessor 102 but at a speed slightly slower that available from the internal cache 104. Hence, the internal cache 104 is often referred to as a primary cache, and the external cache 116 is often referred to as a secondary cache. The power utilization of at least the external cache 116 can be controlled by the microprocessor 102 or the external cache controller 118. For example, the microprocessor 102 can inform the external cache controller 118 (e.g., via the control register 106) that the microprocessor 102 will enter a low power state and that the external cache 116 should also be placed in a low power state. Prior to placing the external cache 116 in the low power mode, the external cache controller 118 would normally operate to flush any contents of the external cache 1 16 that needs to be stored in the RAM 112. Such a flushing operation is necessary to insure coherency between the external cache 116 and the RAM 112. Although not necessary, when returning the external cache 116 to the active state, the external cache controller 118 could also restore the contents of the external cache 118 to their state prior to the flushing operation performed prior to entering the low power state.

The power management techniques for managing the power utilization of the external cache 116 are further described below with respect to FIGS. 2–4B.

Figure 2:
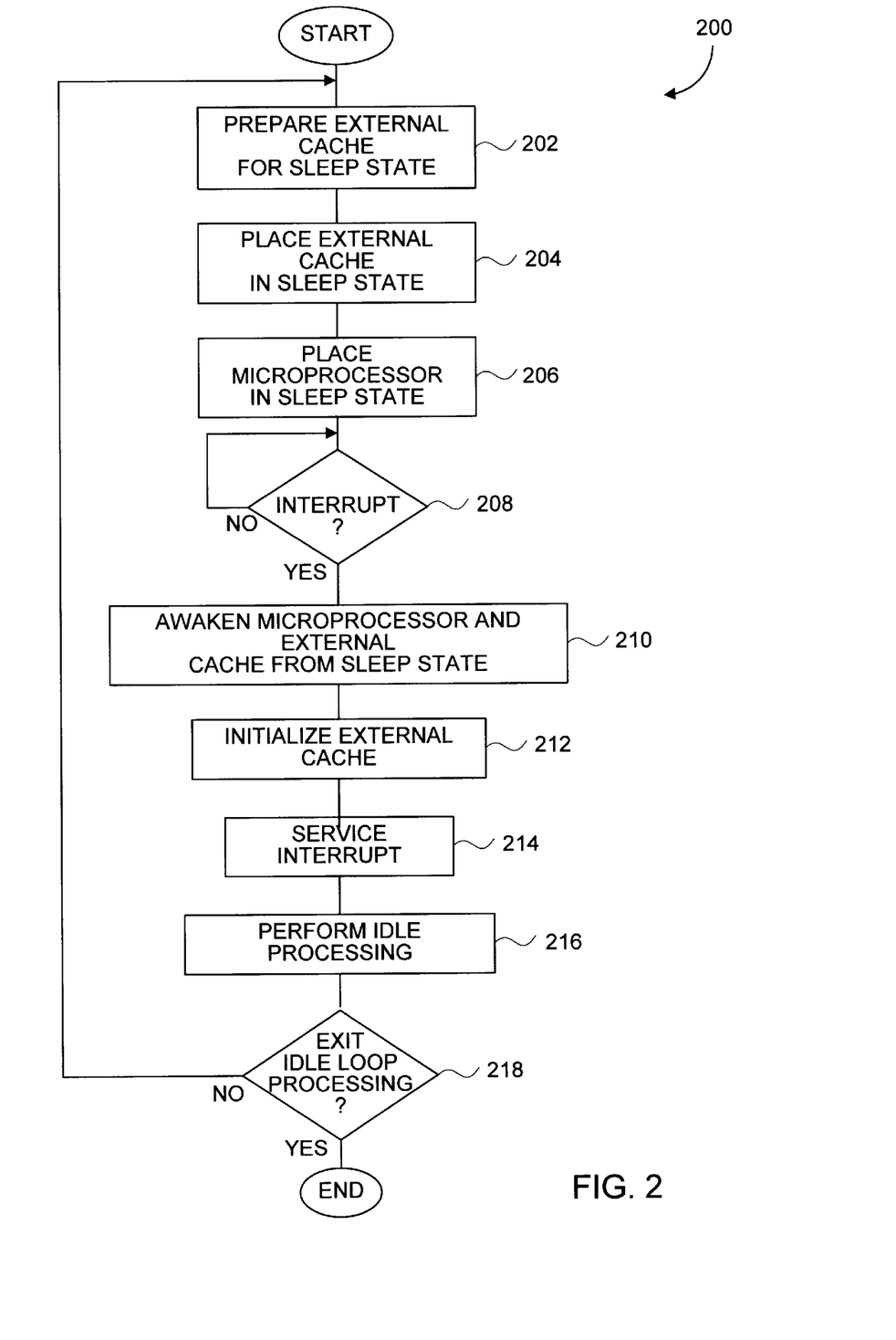
FIG. 2 is a flow diagram of idle loop processing according to an embodiment of the invention.

FIG. 2 is a flow diagram 200 of idle loop processing 200 according to an embodiment of the invention. The idle loop processing 200 is, for example, performed by a computer system such as the computer system 100 illustrated in FIG. 1.

The idle loop processing 200 initially prepares 202 an external cache for a sleep state. Then, the external cache is placed 204 in the sleep state. The sleep state is one type of low power state. A microprocessor is also placed 206 in a sleep state. At this point in the idle loop processing 200, the computer system is idle and the external cache and the microprocessor are in their sleep states and thus power consumption is being conserved.

The idle loop processing 200 now awaits a hardware interrupt from the computer system. Specifically, a decision block 208 determines whether a hardware interrupt has occurred. If a hardware interrupt has not yet occurred, the idle loop processing 200 repeats the decision block 208 until a hardware interrupt has occurred. Typically, the hardware interrupts involve some sort of activity by the computer system, such as a key press, mouse click or timer event. The key press and the mouse click are events recognized by the computer system as indicating user activity. It is not uncommon for a timer event to initiate an interrupt after a certain predetermined period of time which would cause the idle loop processing 200 to awaken the microprocessor for at least a short period of time to perform administrative and background activities. In addition to the administrative and background activities, the idle loop processing 200 could also include specific client processing required by applications running on the computer system. The timer event does not indicate user activity.

Once the decision block 208 determines that a hardware interrupt has occurred, the computer system at least partially awakens to perform some idle processing or interrupt servicing operations. In particular, in order to perform any sort of processing, the microprocessor needs to be awakened 208 from the sleep state to the active state. In addition, in this embodiment of the invention, the external cache is also awakened 210 from the sleep state. After the external cache is awakened 210, the contents of the external cache are initialized 212 to a predetermined state. Thereafter, the interrupt that has been received can be serviced 214. The servicing of the interrupt can take a variety of forms including the retrieval of a key that has been depressed by a user of the computer system, or retrieval of a mouse event initiated by a user of the computer system, or simply the identification of a timer interrupt.

Next, the Idle processing can be performed 216. The duration of the idle processing associated with block 216 is typically limited to a short period of time so that the microprocessor and the external cache can remain in the sleep state for most of the time that the computer system is in the idle loop processing 200. During the short period of time, the idle processing performed can be associated with background operations, operating system maintenance, or program specific operations desired to be performed during the idle processing.

Following block 216, a decision block 218 determines whether idle loop processing 200 should be exited. If the decision block 218 determines that the idle loop processing should not exit, then processing returns to repeat block 202 and subsequent blocks. On the other hand, when the decision block 218 determines that the idle loop processing 200 should exit, then the idle loop processing is complete and ends. The reasons for exiting the idle loop processing 200 include (i) detection the presence of activity (such as from certain of the hardware interrupts) or (ii) periodic exiting after a predetermined number of cycles through the idle loop processing 200 to guarantee that the idle processing is able to performed.

Figure 3A:
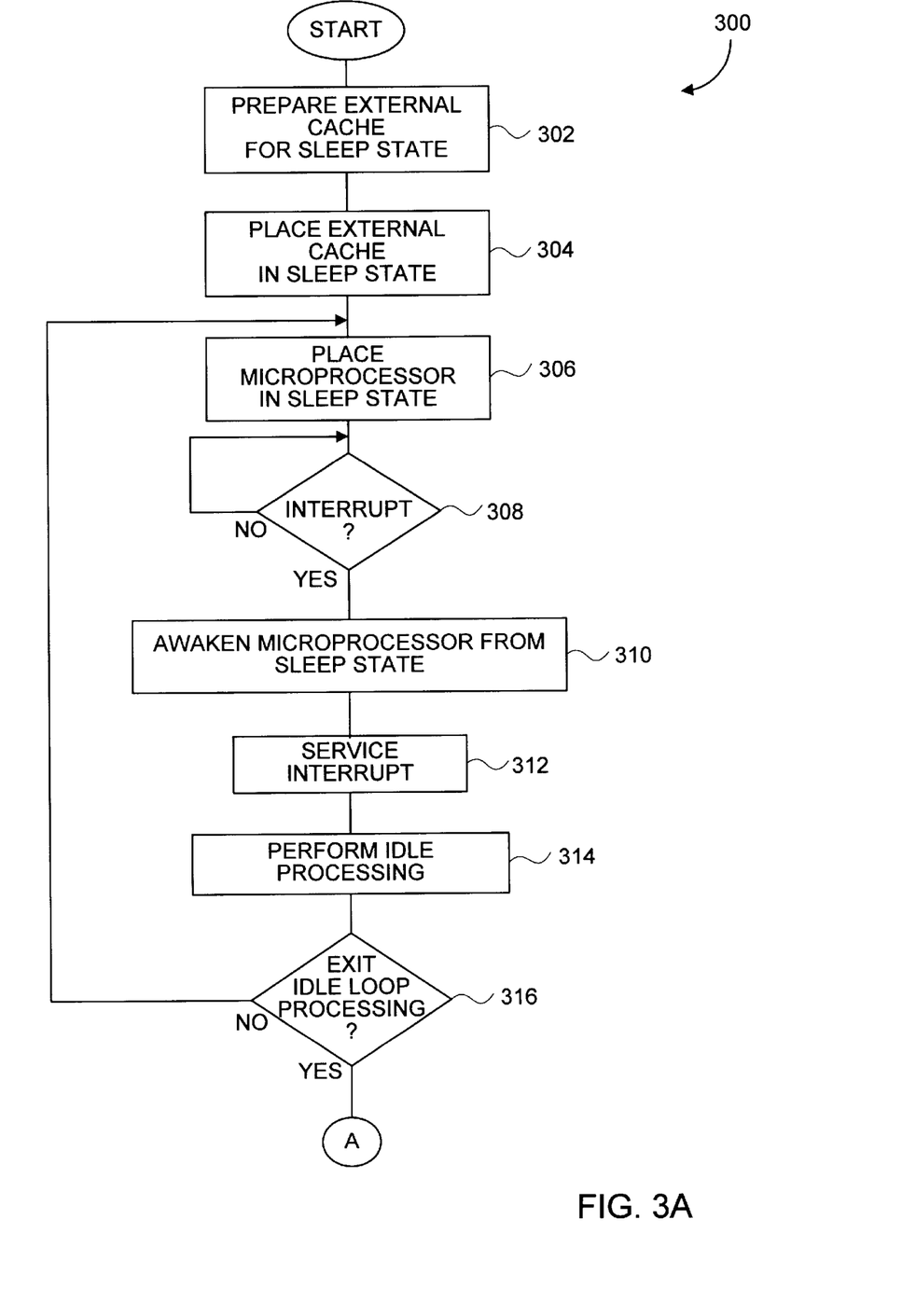
FIGS. 3A and 3B are flow diagrams of idle loop processing according to another embodiment of the invention.
Figure 3B:
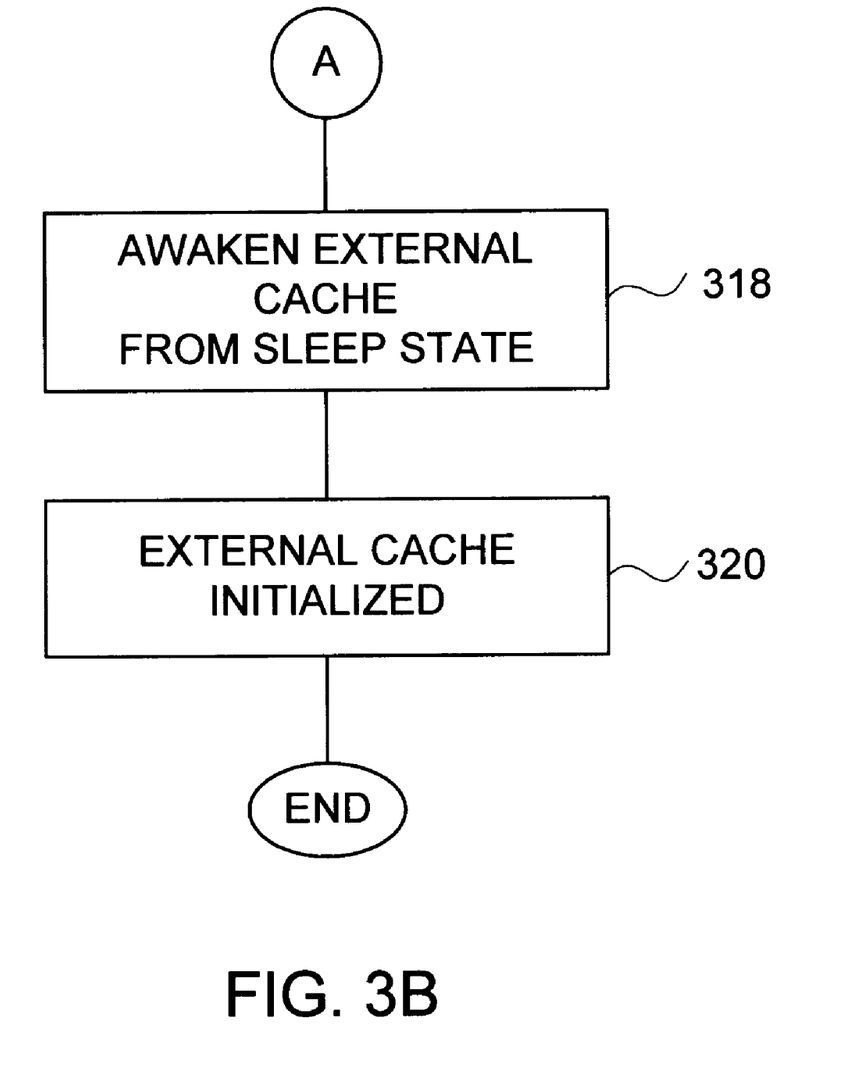

FIGS. 3A and 3B are flow diagrams of idle loop processing 300 according to another embodiment of the invention. The idle loop processing 200 is, for example, performed by a computer system such as the computer system 100 illustrated in FIG. 1.

The idle loop processing 300 is performed when the computer system is determined to be idle (i.e., lack of activity). The idle loop processing 300 initially prepares 302 an external cache for a sleep state. Next, the external cache is placed 304 in the sleep state. The microprocessor of the computer system is also placed 306 in a sleep state. The sleep state is one type of low power state. Next, a decision block 308 determines whether an interrupt has occurred. The interrupt is typically a hardware interrupt caused, for example, by a key press (i.e., keyboard entry), a mouse click, or timer event. Hence, the decision block 308 operates to cause the microprocessor and the external cache to remain in the sleep state until such an interrupt has occurred.

Once an interrupt has occurred, the microprocessor is awakened 310 from the sleep state. The microprocessor awakens 310 to perform some idle processing or interrupt servicing operations. In this embodiment, the external cache remains in the sleep state and is not awakened at this time. After awakening the microprocessor, the interrupt that has been received is serviced 312. Next, idle processing is performed 314 to carry out any background tasks, administrative tasks or client specific tasks that need servicing while the computer system is operating in the idle loop (i.e., idle mode).

Following block 314, a decision block 316 determines whether the idle loop processing 300 should be exited. When the decision block 316 determines that the idle loop processing 300 should not be exited, then the idle loop processing 300 returns to repeat block 306 and subsequent blocks. When repeating block 306, the microprocessor is again placed in the sleep state and then the decision block 308 awaits the receipt of a hardware interrupt.

Accordingly, in this embodiment of the invention, the external cache is not awakened to perform the idle processing (block 314) or to service the interrupt (block 312). The idle loop processing 300 thus does not need to repeat blocks 302 and 304 to prepare and then place the external cache in the sleep state each time a looping operation is caused by the decision block 316. In contrast, the idle loop processing 200 illustrated in FIG. 2 includes the repetitive performance of the operations associated with the blocks 202 and 204; namely, preparation of the external cache for the sleep state and then placement of the external cache in the sleep state.

On the other hand, when the decision block 316 determines that the idle loop processing 300 should be exited, then the external cache is awakened 318 from the sleep state. Next, the external cache is initialized 320. The initialization of the external cache operates to clear all previously stored data from the external cache by setting the data to a known state. In other words, the initialization can store predetermined data in the external cache. Following block 320, the idle loop processing 300 is complete and ends.

According to the idle loop processing 300 illustrated in FIGS. 3A and 3B, the power utilized by the external cache is minimized because the external cache is able to remain in the sleep state during most if not all of the idle loop processing 300. Stated differently, the microprocessor operates to perform servicing of the interrupt and idle processing (blocks 312 and 314) without the use of the external cache which remains in the sleep state, thereby reducing power consumption by the computer system. There may be some performance loss in the microprocessor's execution of the processing associated with servicing the interrupt and the idle processing due to the unavailability of the external cache. However, such performance impact of the lack of the external cache is normally minimal because of the usual presence of an internal cache and the fact that the existing contents of the external cache even if it were active would often not be useful.

Figure 4A:
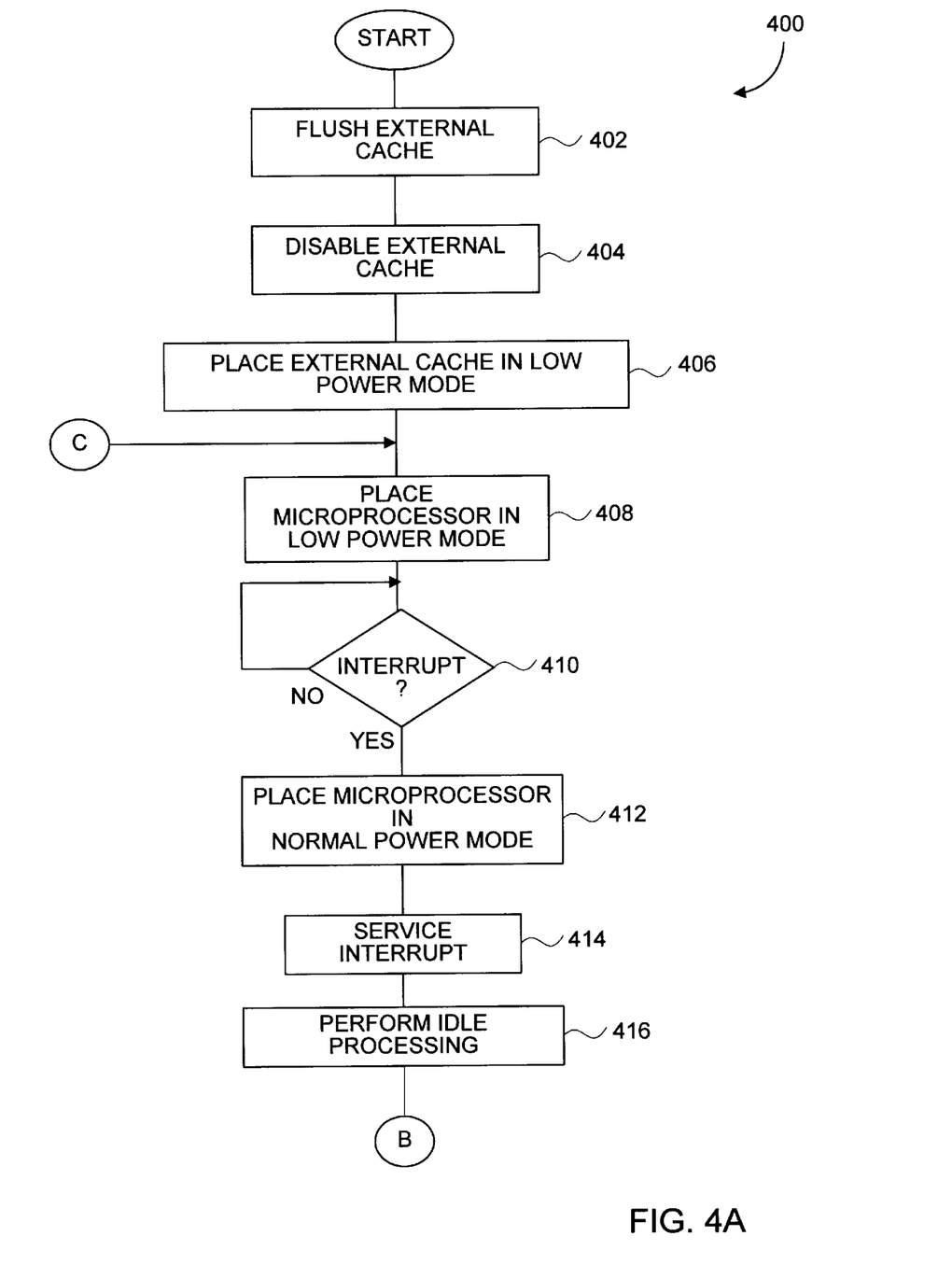
FIGS. 4A and 4B are flow diagrams of idle loop processing according to still another embodiment of the invention.
Figure 4B:
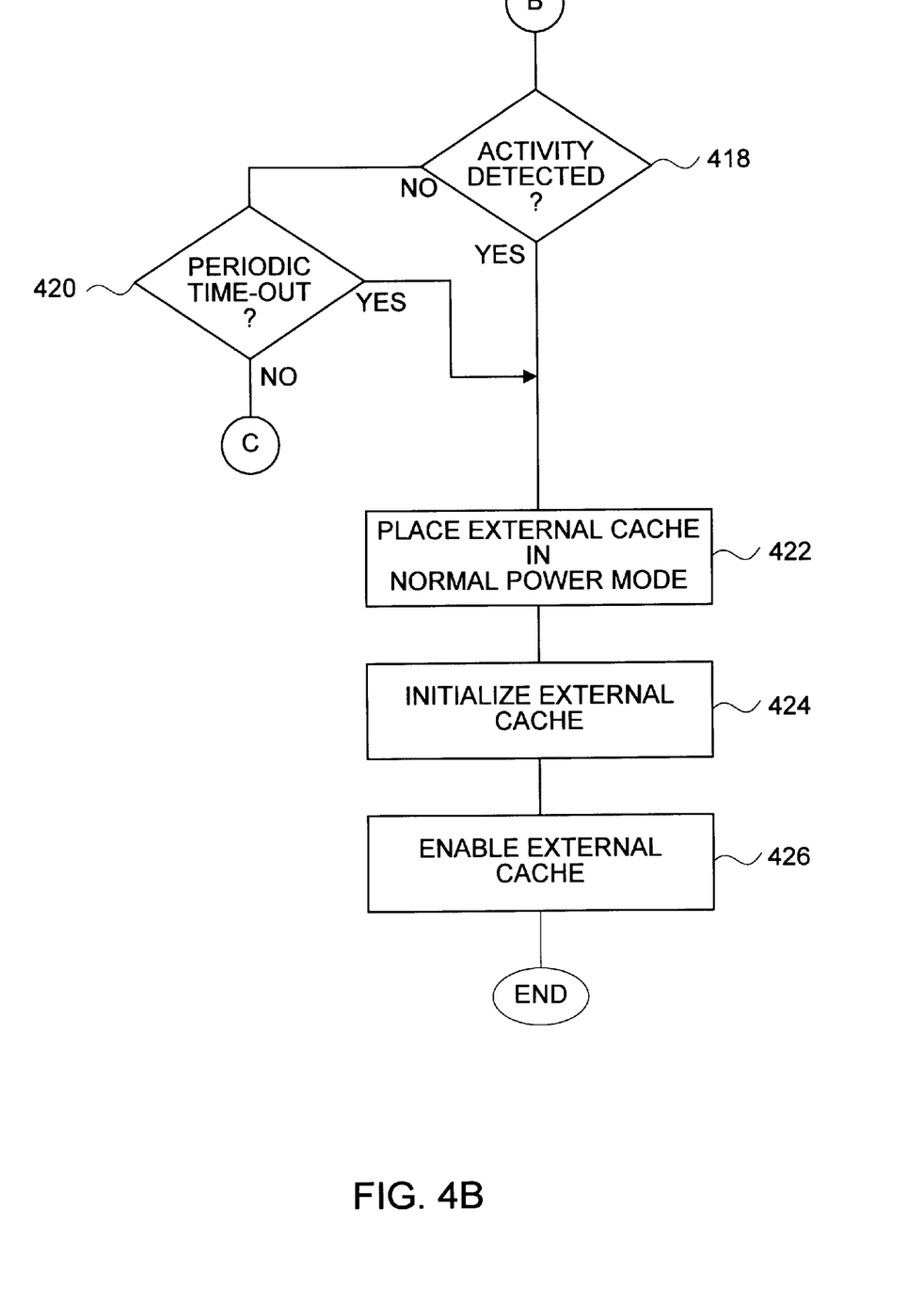

FIGS. 4A and 4B are flow diagrams of idle loop processing 400 according to still another embodiment of the invention. The idle loop processing 400 represents a more detailed diagram of the idle loop processing 300 illustrated in FIGS. 3A and 3B. The idle loop processing 400 is, for example, performed by a computer system such as the computer system 100 illustrated in FIG. 1. The computer system includes a microprocessor, system memory, and an external cache.

The idle loop processing 400 initially flushes 402 the external cache. Then, the external cache is disabled 404 such that the system memory is not able to utilize the external cache. Thereafter, the external cache is placed 406 in a low power mode. The microprocessor is also placed 408 in a low power mode. At this point, both the external cache and the microprocessor are in the low power mode and thus the power utilization by the computer system is significantly reduced. The reduction of power in the idle loop processing 400 is advantageous for all computer systems, but it particularly advantageous for those computer system that are battery powered. The reduction in power utilization results in longer battery life.

A decision block 410 then determines whether an interrupt has occurred. As long as an interrupt has not yet occurred, the decision block 404 awaits for the receipt of an interrupt. Normally, the interrupt is a hardware interrupt that signals the microprocessor directly or indirectly through an interrupt controller. Typical events that could invoke hardware interrupts can include a key press, a mouse click, and a timer event.

Once the decision block 410 determines that an interrupt has occurred, then the idle loop processing 400 places 412 the microprocessor in a normal power mode. After the placing the microprocessor in the normal power mode, the interrupt is serviced 414. In addition, idle processing can be performed 416. Hence, the microprocessor is able to perform some processing in the idle loop processing 400 without the full awakening of the computer system. The idle processing can perform administrative tasks, background tasks, or specific program tasks requested by client programs during the idle processing loop.

Next, a decision block 418 determines whether activity has been detected. If activity has been detected, then the decision block 418 performs processing to awaken the balance of the computer system, namely the external cache and perhaps other subsystems. On the other hand, when the decision block 418 does not detect any activity, then a decision block 420 determines whether a periodic time-out has occurred. When the decision block 420 determines that a periodic time-out has not yet occurred, then the idle loop processing 400 performs a looping operation by returning to repeat the block 408 and subsequent blocks. Alternatively, when the decision block 420 determines that a periodic time-out has occurred, then the idle loop processing 400 also operates to fully awaken the computer system.

To fully awaken the computer system, the idle loop processing 400 operates to awaken the external cache. In awakening the external cache, the external cache is initially placed 422 in a normal power mode. Then, the external cache is initialized 424. Preferably, the initialization of the external cache sets all the data stored in the external cache to a known, predetermined state. After the external cache is placed in the normal mode and initialized, the external cache is enabled 426. Following block 426, the idle loop processing 400 is complete and ends.

The advantages of the invention are numerous. One advantage of the invention is that with the power management techniques of the invention, the computer system as a whole, and in particular an external cache of the computer system, consumes less power. Another advantage of the invention is that battery powered devices obtain improved battery life through use of the power management techniques of the invention.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for reducing power consumption of a computer system, the computer system including a processor, system memory, and an external cache memory, said method comprising:

(a) entering an idle mode in which the processor and the external cache memory are in a sleep state;

(b) determining whether an interrupt has occurred;

(c) awakening the processor from the sleep state to a normal state and not awakening the external cache memory when said determining (b) determines that an interrupt has occurred;

(d) servicing the interrupt;

(e) performing idle processing without use of the external cache memory which remains in the sleep state;

(f) determining whether the idle mode should be exited and a normal mode entered; and (g) awakening the external cache memory from the sleep state to a normal state when said determining (f) determines that the idle mode is to be exited and the normal mode entered.

2. A method as recited in claim 1, wherein said entering (a) the idle mode comprises:

(a1) preparing the external cache memory for the sleep state;

(a2) placing the external cache memory in the sleep state; and (a3) placing the microprocessor in the sleep state.

3. A method as recited in claim 2, wherein said preparing (a1) includes flushing out content of the external cache memory to the system memory.

4. A method as recited in claim 3, wherein said method further comprises:

(h) initializing the content of the external cache memory following said awakening (g).

5. A method as recited in claim 1, wherein during the idle processing the processor performs background processing tasks.

6. A method as recited in claim 1, wherein said entering (a) of the idle mode occurs when the normal mode lacks events to process.

7. A method as recited in claim 1,
wherein said entering (a) the idle mode comprises:

(a1) flushing the external cache memory for the sleep state;

(a2) placing the external cache memory in the sleep state; and (a3) placing the microprocessor in the sleep state.

8. A method as recited in claim 7, wherein said awakening (g) of the external cache memory places the external cache memory in the normal state and initializes the external cache memory.

9. A method as recited in claim 7, wherein said computer system is a portable computer system.

10. A method as recited in claim 1, wherein the sleep state is a low powered state in which the microprocessor either does not execute instructions or does execute instructions at a substantially slowed speed as compared to the normal state.

11. A method as recited in claim 1, wherein said determining of whether the idle mode should be exited is done based on the presence of activity.

12. A method as recited in claim 1, wherein the computer system further includes an internal cache memory integral with the processor, the integral cache memory in set in either a sleep state or a normal state based on the state of the processor.

13. A method as recited in claim 1, wherein said method further comprises: (h) returning the processor to the sleep state after the interrupt has been serviced and when said determining (f) determines that the idle mode is not to be exited.

14. A computer system, comprising:

a microprocessor for executing instructions associated with an event loop or an idle loop, said microprocessor including an internal primary cache memory for temporarily storing data for use by said microprocessor, said microprocessor having a normal power mode and a low power mode;

an external secondary cache memory for temporarily storing data for use by said microprocessor, said microprocessor having a normal power mode and a low power mode; and a power management unit operatively connected to said microprocessor and said external cache memory, said power management unit controls whether said microprocessor and said external secondary cache memory are placed in either the normal power mode or the low power mode, respectively, wherein in the event loop, said microprocessor and said external secondary cache memory are in the normal power mode, and wherein in the idle loop, said microprocessor is mostly in the low power mode but periodically said microprocessor is in the normal power mode to service an interrupt and perform idle processing, and said external secondary cache memory always remains in the low power mode while in the idle loop.

15. A method as recited in claim 14, wherein the low power mode is an inactive state, and the normal power mode is an active state.

16. A computer system as recited in claim 14, wherein said computer system is a portable computer system.

17. A computer system as recited in claim 14, wherein said computer system is a hand-held portable computer system.

18. A computer readable medium including at least computer program code for reducing power consumption of a computer system, the computer system including a processor, system memory, and an external cache memory, said computer readable medium comprising:

computer program code for entering an idle mode and having the processor and the external cache memory in a sleep state;

computer program code for determining whether an interrupt has occurred;

computer program code for awakening the processor from the sleep state to a normal state and not awakening the external cache memory when said computer program code for determining determines that an interrupt has occurred;

computer program code for servicing the interrupt;

computer program code for performing idle processing with use of the processor in the normal state and without use of the external cache memory which remains in the sleep state;

computer program code for determining whether the idle mode should be exited and a normal mode entered; and computer program code for awakening the external cache memory from the sleep state to a normal state when said computer program code for determining determines that the idle mode is to be exited and the normal mode entered.

19. A computer readable medium as recited in claim 18, wherein said method further comprises:

computer program code for returning the processor to the sleep state after the interrupt has been serviced and when said computer program code for determining determines that the idle mode is not to be exited.

20. A computer readable medium as recited in claim 18, wherein said computer program code for entering the idle mode comprises:

computer program code for preparing the external cache memory for the sleep state;

computer program code for placing the external cache memory in the sleep state; and computer program code for placing the microprocessor in the sleep state.

21. A computer readable medium as recited in claim 20, wherein said method further comprises:

computer program code for initializing the content of the external cache memory following said computer program code for awakening.

22. A computer readable medium as recited in claim 18, wherein during the idle processing the processor performs background processing tasks, and wherein said computer program code for entering of the idle mode is performed when the normal mode lacks events to process.

23. A computer readable medium as recited in claim 18, wherein said computer program code for awakening of the external cache memory places the external cache memory in the normal state and initializes the external cache memory.

24. A computer readable medium as recited in claim 18, wherein said computer system is a portable computer system.

25. A computer readable medium as recited in claim 18, wherein the sleep state is a low powered state in which the microprocessor either does not execute instructions or does execute instructions at a substantially slowed speed as compared to the normal state.

* * * * *